United States Patent Office 3,450,628
Patented June 17, 1969

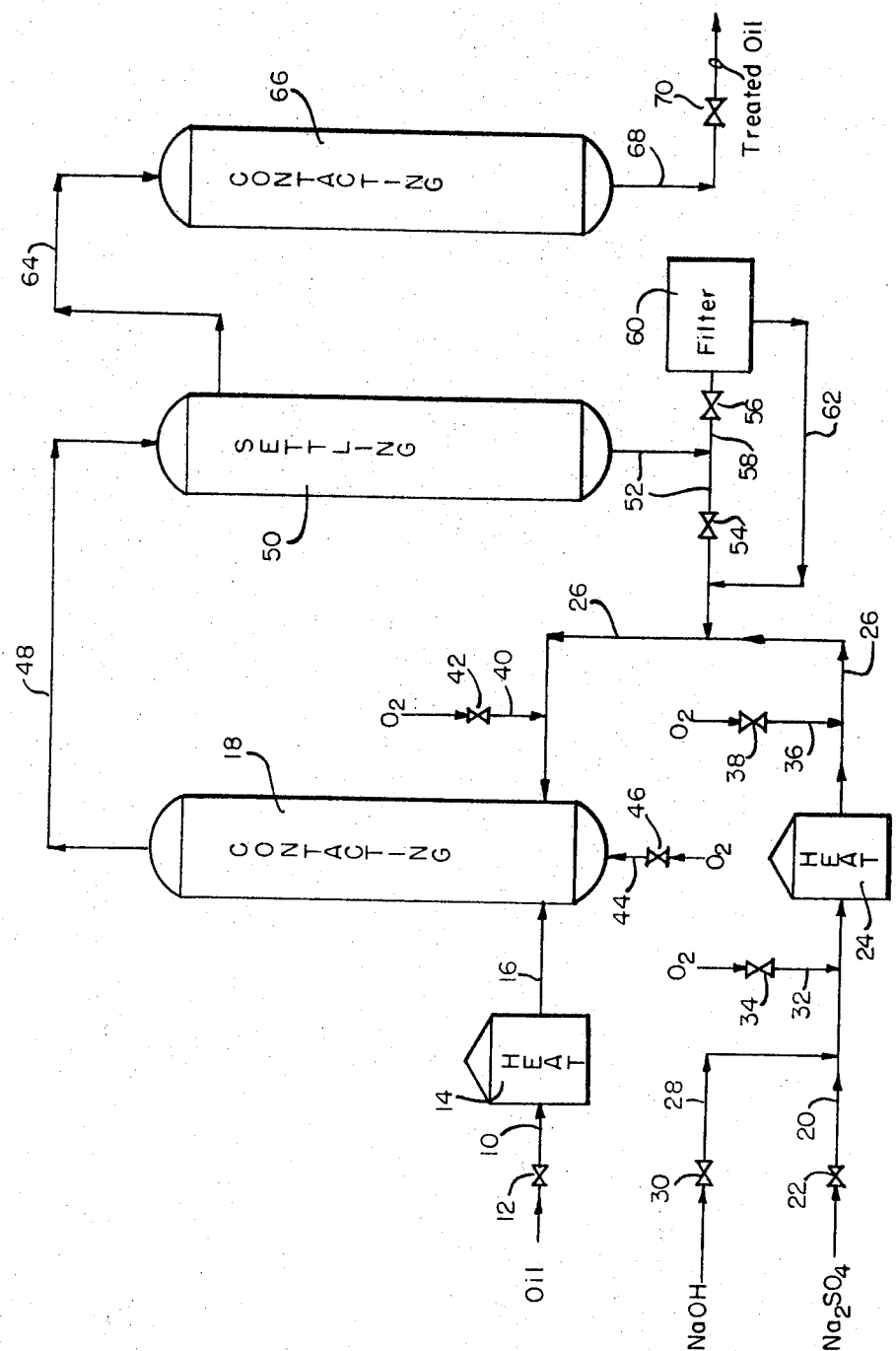

3,450,628
PROCESS FOR TREATING MINERAL OILS
CONTAINING MERCAPTANS
Charles W. Rippie, Ashland, Ky., assignor to Ashland Oil
& Refining Company, Houston, Tex., a corporation of
Kentucky
Filed Dec. 28, 1966, Ser. No. 605,235
Int. Cl. C10g 27/06, 19/02
U.S. Cl. 208—189            17 Claims

ABSTRACT OF THE DISCLOSURE

A method for treating mineral oils containing sulfur in mercaptan form to convert the sulfur to a disulfide form which may be left in the oil, which includes contacting the oil with about 5 to 15% by volume of an aqueous solution of a mixture of about 95 to 99.5% by weight of sodium sulfate, and 5.0 to 0.5% by weight of sodium hydroxide, while blowing with oxygen and maintaining a temperature between about 170° F. and 200° F., separating the treated oil from the aqueous treating solution, and thereafter contacting the treated oil with charcoal to remove sludge and rock salt to remove water. The treating solution may be filtered after separation from the oil and recycled to the first step.

---

The present invention relates to the purification of mineral oils. More specifically, the present invention relates to the purification of mineral oils containing contaminating mercaptans. A still more specific aspect of the present invention is the purification of fuel oils containing mercaptans and metal hydroxide contaminants.

Heretofore numerous treatments have been utilized for the purification of mineral oils and mineral oil fractions. This is particularly true where one wishes to remove sulfur in the form of mercaptans, from a crude oil or fuel oil fractions. In most such cases the primary approach to the purification of the mineral oil fraction is the complete removal or conversion and removal of the sulfur compounds from the mineral oil. Such complete removal of the sulfur compounds is, in most cases, difficult to accomplish and, at best, is not wholly effective, since there usually remains a high percentage of sulfur compounds even after treating. It is therefore highly desirable that a simple process be provided for the purification of mineral oils and mineral oil fractions.

It is therefore an object of the present invention to overcome the above-mentioned difficulties and to provide a simple and economical method for the purification of mineral oils and mineral oil fractions. Another object of the present invention is to provide an improved technique for purifying mineral oils and mineral oil fractions containing mercaptans. Another and further object of the present invention is to provide an improved process for purifying mineral oils and mineral oil fractions containing mercaptans wherein the mercaptans are converted to innocuous materials. A still further object of the present invention is to provide an improved process for purifying furnace oils. A further object of the present invention is to provide an improved process for purifying mineral oils and mineral oil fractions containing mercaptans and metal hydroxide contaminants. Another and further object of the present invention is to provide an improved process for the treatment of mineral oils and mineral oil fractions wherein the oil is treated with sodium sulfate to convert mercaptans to innocuous materials. Yet another object of the present invention is to provide an improved process for the purification of furnace oils containing mercaptans and metal hydroxide contaminants wherein the oil is contacted with a critical mixture of sodium hydroxide and sodium sulfate at an elevated temperature and in the presence of oxygen. These and other objects and advantages of the present invention will be apparent from the following detailed description when read in conjunction with the drawing.

In accordance with the present invention, it has been found, quite surprisingly, that mineral oils and mineral oil fractions can be economically and simply purified by contacting such oils with an aqueous solution of sodium sulfate. More specifically, it has been found that mercaptan impurities, in mineral oils and mineral oil fractions, can be converted to innocuous disulfides, and permitted to remain in the oil, by contacting the oil with a critical mixture of sodium hydroxide and sodium sulfate at an elevated temperature and in the presence of oxygen.

Reference will now be made to the drawing for the details of the present invention. In accordance with the drawing, the oil to be treated is passed through line 10 and valve 12 to a suitable heater 14. As will be pointed out hereinafter, the oil may or may not be heated for purposes of the present invention. From heater 14 the oil passes through line 16 to an appropriate contacting unit 18. An aqueous sodium sulfate solution, from a source not shown, is introduced to the system through line 20 and valve 22. From line 20 the sodium sulfate solution passes to an appropriate heater 24. As indicated previously, the oil may be heated in heater 14 but preferably the sodium sulfate solution is heated in heater 24. From heater 24, the sodium sulfate solution passes through line 26 to contacting unit 18. While contacting unit 18 is shown as a concurrent contacting unit, it is to be understood that this unit may be countercurrent. When it is desired to also utilize sodium hydroxide in the treating solution of the present invention, such sodium hydroxide or caustic is introduced to the system through line 28 and valve 30. From line 28 the caustic joins the sodium sulfate solution in line 20. In the preferred form of the present invention, the sodium sulfate and sodium hydroxide solution is heated in heater 24 and passed through line 26 and oxygen is blown through the treating solution by introducing oxygen at one of several points. For example, the oxygen may be introduced through line 32 and valve 34 before passing the solution to heater 24. It may also be introduced to the system through line 36 and valve 38 following heating in heating unit 24. A third point of oxygen introduction can be through line 40 and valve 42 which is located in line 26 at a point following the introduction of a recycle stream of treating solution, as will be discussed hereinafter. Finally, oxygen may be introduced to the system in the contacting tower 18 itself by introducing the oxygen through line 44 and valve 46. After intimately contacting the oil and treating solution in contacting unit 18, the treated oil is discharged from the contacting unit through line 48. From line 48, the treated oil passes to an appropriate settling zone 50. In settling zone 50, an aqueous phase, containing the treating solution, and an oil phase, containing the treated oil, are separated. The treating solution or aqueous phase is discharged from the bottom of settling zone 50 through line 52. From line 52 the treating solution can then be recycled to contacting unit 18 by passing the same to line 26. As previously pointed out, the oxygen introduced to the system may be introduced after the recycle solution from line 52 has joined any make-up solution in line 26. Where substantial volumes of recycle solution are employed, it is obvious that the oil itself should be heated. Where the metal hydroxide impurities are present in the oil, these impurities form insoluble precipitates in the aqueous phase. Accordingly, where such precipitates are present the precipitate is removed by closing valve 54 in line 52 and opening valve 56 in line 58 to pass the aqueous phase to filter 60, or other appropriate separating unit. From filter 60 the clarified, recycle treating solution is passed through line 62 back to line 52. The oil phase or treated oil may be discharged from settling zone 50 through line 64. From line 64 the treated oil passes to contacting zone 66. Contacting zone 66 contains an appropriate solid absorbent material adapted to remove sludge materials and any residual or entrained water carried over with the treated oil. Preferably, contacting unit 66 contains charcoal and sodium chloride in solid form. More specifically, contacting unit 66 contains charcoal and rock salt. These materials may be mixed in the contacting tower but are preferably maintained in the tower in layers so that they may be readily removed and replaced when necessary. The treated and clarified oil is then discharged from contacting tower 66 through line 68 and valve 70.

In the preferred form of the present invention the sodium sulfate is an inexpensive material known as "salt cake." Salt cake is a somewhat impure source of sodium sulfate (90–99%) obtained usually as a by-product from the production of hydrochloric acid; by crystallization from natural brines; from the coagulating bath in the production of viscose rayon; or by the Hargreaves process. Impurities vary with the source of the material, but, in any event, it has been found that this material is quite adequate for use in the present invention and provides a relatively inexpensive source of treating agent.

It has been found in accordance with the present invention that about 5 to 15%, and preferably 10%, by volume of treating solution based on the volume of oil being treated should be used. The solution should be about 40 to 60%, and preferably 50%, saturated. The contact time should be at least 1 minute and the temperature of contact should be between about 170° F. and 200° F. The ratio of caustic to salt cake in treating solution should be about 0.5 to 5% by weight of caustic and 99.5 to 95% by weight of salt cake.

When operating on mineral oil fractions, particularly fuel oil fractions, containing mercaptans and metal hydroxides, it has been found, in accordance with the present invention that it is critical that the sodium sulfate be present in the treating solution and also that heat be utilized. In treating such fuel oils, the caustic alone has a tendency to foam when oxygen is passed through the system. It has also been found that little or no conversion of mercaptans results if heat is not employed.

The following examples illustrate the operation of the present invention and the criticality of the various components and conditions of treatment.

A blend of 60% light cycle oil and 40% virgin gas oil, representing a typical No. 2 fuel oil was contacted with a saturated aqueous solution of sodium sulfate containing about 3% by weight of sodium hydroxide at 200° F. The treated oil had the following characteristics:

| | | |
|---|---|---|
| Gravity | | 33.6 |
| I.B.P. | ° F | 402 |
| Percent: | | |
| 5 | ° F | 432 |
| 10 | ° F | 448 |
| 20 | ° F | 468 |
| 30 | ° F | 484 |
| 40 | ° F | 498 |
| 50 | ° F | 510 |
| 60 | ° F | 524 |
| 70 | ° F | 538 |
| 80 | ° F | 556 |
| 90 | ° F | 577 |
| 95 | ° F | 593 |
| E.P. | ° F | 630 |
| Color | | 1 |
| Flash | | 174 |
| Cloud | | +2 |
| Pour | | −5 |
| Copper No. | | 3 |
| LECO sulfur | | 0.31–0.30 |

The "Color" indication is a code designation for the amount of light transmitted through a sample and compared with a standard. A Saybolt Chromometer was utilized and the lower numbers indicate greatest light transmission or, stated differently, lightest colored products. The "Copper No." is also a code number for corrosive sulfur content (generally mercaptan content). In this test the number indicates the number of milliliters of a standard copper sulfate solution necessary to react with the mercaptans in 100 milliliters of sample. The lower numbers again indicate a superior product and the specifications for a No. 2 fuel oil include a maximum Copper No. 3. The "LECO sulfur" is a quantitative measure of total sulfur. The specifications for No. 2 fuel oil require a maximum of 0.5% by weight of sulfur. It is to be recognized that the sulfur contents of raw oil and treated oil in this case are essentially the same since mercaptan sulfur is converted to innocuous sulfur compounds and essentially no sulfur is removed.

In a comparative test under the same conditions an oil containing more than the allowable amount of sulfur (1.5% by weight) was treated and the Copper No. was reduced from 13 to 4½.

A light cycle oil was treated similarly with a sodium sulfate solution diluted to twice the volume of a saturated solution and containing about 3.2% of sodium hydroxide at 170° F. The Copper No. was reduced from 8 to 3. In addition, a hydrochloric acid extract of the oil was neutralized with ammonia and filtered through a ½ micron filter. The treated oil yielded a small precipitate while the raw oil yielded a substantial amount of precipitate. This precipitate is indicative of metallic hydroxide content which is responsible for furnace burner deposits.

While specific examples have been given and specific illustrations set forth, it is to be understood that these are by way of suggestion only and the present invention is to be limited only in accordance with the appended claims.

I claim:
1. A method of treating mineral oils containing sulfur in mercaptan form; comprising, contacting said oil with an aqueous solution of a mixture of a major proportion of sodium sulfate and a minor proportion of sodium hydroxide, in the presence of oxygen and at a temperature between about 170° F. and 200° F. and separating the treated oil from the aqueous treating solution.

2. A method in accordance with claim 1 wherein the treating solution is utilized in an amount of about 5 to 15% by volume based on the volume of oil treated.

3. A method in accordance with claim 1 wherein the ratio of sodium sulfate to sodium hydroxide in the treating solution is at about 95.0 to 99.5% by weight of sodium sulfate to 5.0 to 0.5% by weight of sodium hydroxide.

4. A method in accordance with claim 1 wherein the solution is between about 40 and 60% saturated.

5. A method in accordance with claim 1 wherein the oil is contacted with the treating solution for at least 1 minute.

6. A method in accordance with claim 1 wherein the treating solution is separated from the treated oil by settling.

7. A method in accordance with claim 6 wherein the separated treating solution is recycled to the contacting step.

8. A method in accordance with claim 6 wherein the separated treating solution is filtered and then recycled to the contacting step.

9. A method in accordance with claim 1 wherein the separated oil phase is thereafter treated to remove sludge and water therefrom.

10. A method in accordance with claim 9 wherein the removal of sludge is effected by contact with charcoal.

11. A method in accordance with claim 9 wherein the removal of water is effected by contact with rock salt.

12. A method in accordance with claim 9 wherein the removal of sludge and water is effected by contact with charcoal and rock salt.

13. A method in accordance with claim 1 wherein oxygen is passed through the treating solution prior to the contacting step.

14. A method in accordance with claim 1 wherein oxygen is passed through the treating solution during the contacting step.

15. A method of treating mineral oils containing sulfur in mercaptan form; comprising, contacting said oil with an aqueous solution of sodium sulfate at a temperature of about 170° to 200° F. and separating the treated oil from the aqueous treating solution.

16. A method in accordance with claim 15 wherein the contacting is carried out in the presence of oxygen.

17. A method in accordance with claim 15 wherein the sodium sulfate is salt cake.

References Cited

UNITED STATES PATENTS 43,325   6/1864   Merrill _____ 208—284

DELBERT E. GANTZ, *Primary Examiner.*

G. J. CRASANAKIS, *Assistant Examiner.*

U.S. Cl. X.R.

208—203, 286, 288